United States Patent [19]
Kolehmainen et al.

[11] 3,768,339
[45] Oct. 30, 1973

[54] THROTTLE PRESSURE CONTROL FOR AN AUTOMATIC POWER TRANSMISSION MECHANISM

[75] Inventors: Jack A. Kolehmainen, Detroit; George E. Lemieux, Livonia, both of Mich.

[73] Assignee: Ford Motor Company, Dearborn, Mich.

[22] Filed: Dec. 27, 1971

[21] Appl. No.: 212,316

[52] U.S. Cl. .................................. 74/864, 74/843
[51] Int. Cl. .......................................... B60k 21/00
[58] Field of Search ..................... 74/864, 863, 856, 74/857, 843, 844

[56] References Cited
UNITED STATES PATENTS
3,292,448  12/1966  Roskopf et al. ....................... 74/864
3,401,582   9/1968  Joulmes ................................ 74/864
3,688,606   9/1972  Lemieux et al. ...................... 74/863

*Primary Examiner*—Arthur T. McKeon
*Attorney*—Keith L. Zerschling et al.

[57] ABSTRACT

A throttle valve system for an automatic power transmission mechanism in an automotive vehicle having an internal combustion engine comprising a manifold pressure-operated diaphragm actuator for applying valve forces to a throttle pressure modulator valve, a vacuum regulator in communication with the actuator and with a source of relatively constant negative pressure for distributing to the actuator a controlled vacuum that is related in magnitude to engine throttle displacement, the regulator being connected mechanically to the throttle whereby the actuator produces a transmission throttle valve signal that is independent of variations in engine intake manifold pressure due to the effects of engine exhaust emission control devices.

6 Claims, 3 Drawing Figures

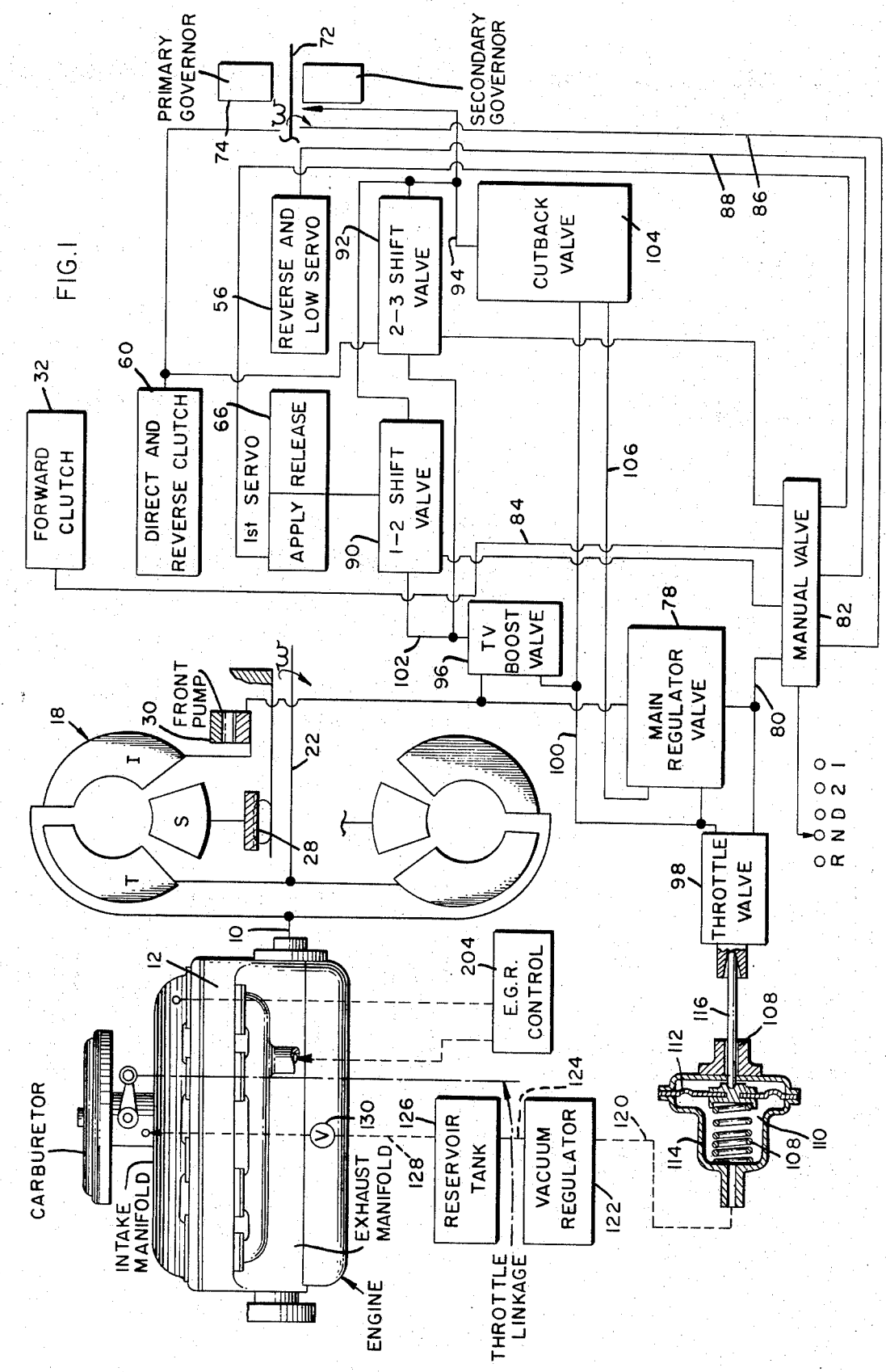

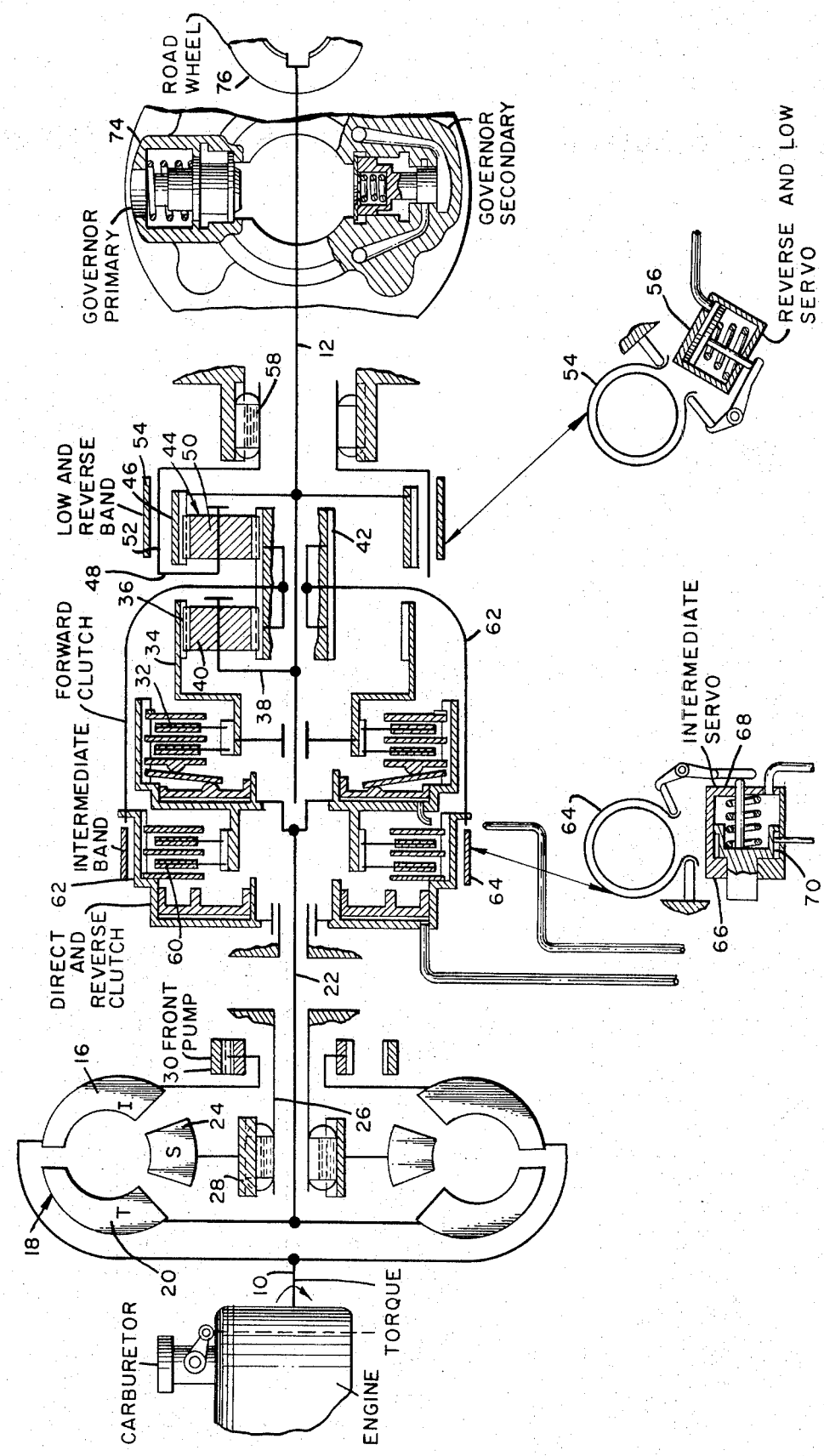

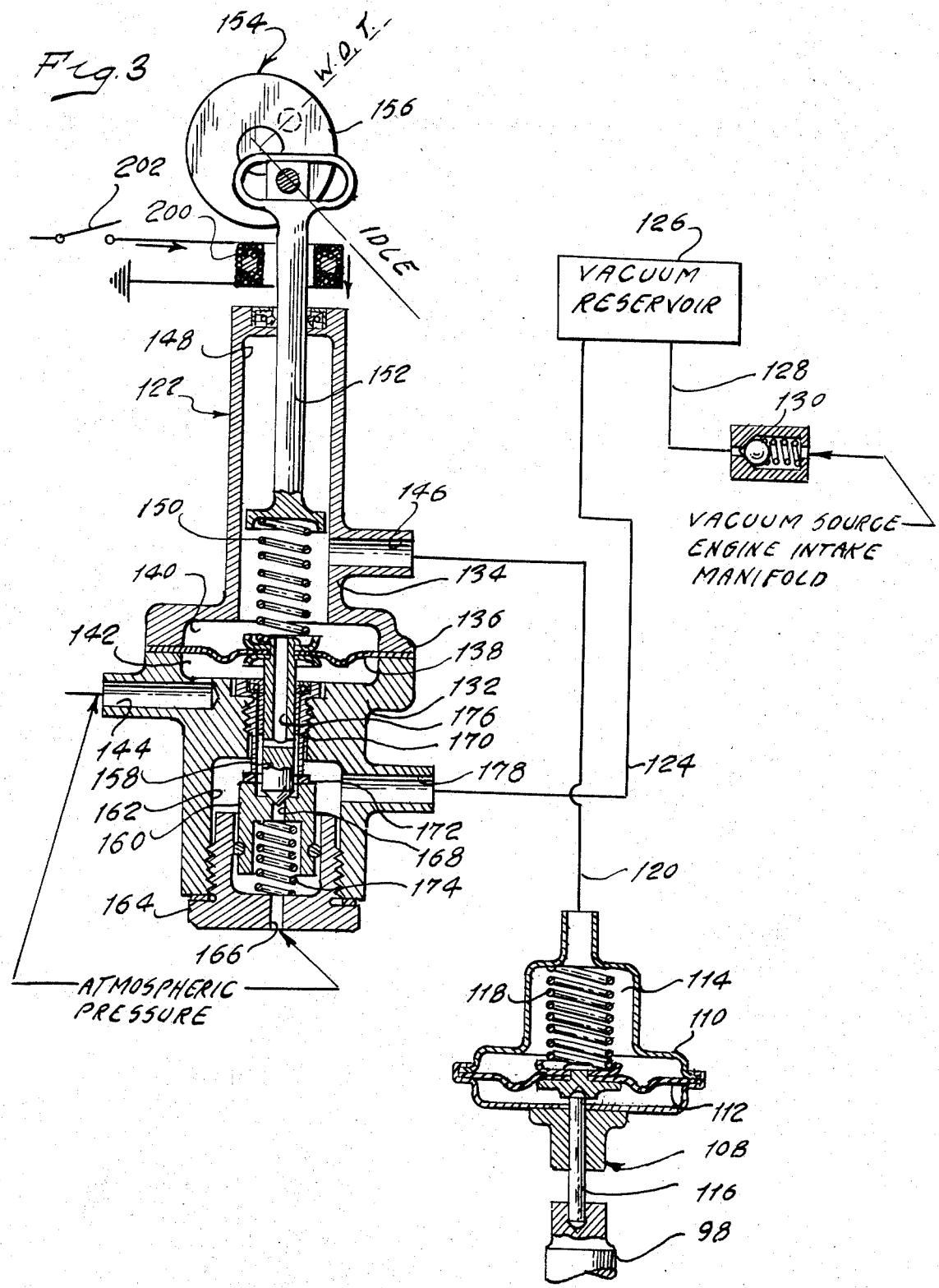

THROTTLE PRESSURE CONTROL FOR AN AUTOMATIC POWER TRANSMISSION MECHANISM

GENERAL DESCRIPTION OF THE INVENTION

Our invention is adapted especially to be used in a control valve circuit for an automatic power transmission mechanism in an automotive vehicle driveline having an internal combustion engine with an air-fuel mixture intake manifold. The transmission includes gearing which is capable of establishing multiple torque delivery paths between the engine crankshaft and the power transmission output shaft. Clutch means and brake means are provided for controlling the relative motion of the gear elements as the various speed ratios are established and disestablished. Ratio shift control valves in the circuitry connecting the pressure source and the clutch and brake means control the actuation of the clutch and brake means. The shift valves respond to vehicle speed as well as engine torque. A main regulator valve system in communication with the fluid pressure source is designed to establish a correct operating pressure level for the clutch and brake means so that optimum engagement and release forces are achieved and the proper engagement and release rates are maintained for any given operating condition during the operating mode.

It is conventional practice to provide an engine torque signal that is related in magnitude to engine intake manifold pressure. The signal is used to control the operating pressure level of the pressure regulator valve and to initiate speed ratio changes in the shift valves. It is possible, however, for the relationship between engine manifold pressure and the throttle pressure signal to be changed if certain engine exhaust gas emission control devices are used. For example, if the emission control system employs exhaust gas recirculation, the engine manifold pressure may be increased without any accompanying increase in engine torque. Such exhaust gas recirculation devices comprise exhaust gas passages extending from the engine exhaust manifold and through an exhaust gas recirculation control valve to the intake manifold where the exhaust gases are recycled through the combustion process. This reduces the operating temperature of the combustible fuel mixture and reduces the percentages of oxides of nitrogen, unburned hydrocarbons and other undesirable engine exhaust pollutants.

If the relationship between the manifold vacuum and engine throttle pressure is upset, the calibration of the transmission control valve is affected. It is necessary, therefore, for the operator to advance the engine carburetor throttle to a greater degree for any given operating torque than otherwise would be the case during ratio changes. This causes late torque upshifts and undue harshness in the shifts, the latter being caused by the increased circuit pressure made available by the regulator valve means without any accompanying increased torque being transmitted through the friction elements of the clutch and brake means.

In our improved throttle valve system, I have isolated the engine intake manifold from the engine throttle valve mechanism and have provided an auxiliary vacuum or negative pressure source. We have provided also a negative pressure regulator which responds to engine throttle valve movement to produce an output pressure that is used by the actuator for the transmission throttle valve mechanism. The regulator may be calibrated so that any desired functional relationship between engine throttle position and the transmission throttle valve pressure can be achieved regardless of whether pressure variations occur in the engine intake manifold due to the operation of various exhaust emission control devices.

BRIEF DESCRIPTION OF THE FIGURES OF THE DRAWING

FIG. 1 shown in schematic form a transmission control circuit embodying the improved throttle valve system of our invention;

FIG. 2 shows in schematic form a transmission mechanism adapted to be used in this system of FIG. 1;

FIG. 3 is a subassembly view, partly in schematic form, showing a pressure regulator valve and a transmission throttle valve actuator used in the circuit of FIG. 1.

PARTICULAR DESCRIPTION OF THE INVENTION

Numeral 10 indicates one end of the crankshaft of an internal combustion engine. The engine is shown in FIG. 2 at 12. Shaft 10 is connected to impeller 16 of the hydrokinetic torque converter 18. Turbine 20 is situated in toroidal fluid flow relationship with respect to the impeller 16. It is connected drivably to turbine shaft 22. Bladed stator 24 is situated between the fluid flow outlet region of turbine 20 and the fluid flow inlet region of the impeller 16. It is journalled for rotation on stationary stator sleeve shaft 26 and it is anchored against rotation in a direction opposite to the direction of rotation of the engine by overrunning brake 28. Freewheeling motion of the stator 24 in the opposite direction is permitted.

Positive displacement pump 30 is connected drivably to impeller 16. Pump 30 serves as a pressure source for the control circuit to be described with reference to FIG. 2.

Turbine shaft 22 is connected to the torque input side of a forward clutch 32. This establishes selectively a frictional driving connection between the shaft 22 and ring gear 34 for a first simple planetary gear unit 36.

Gear unit 36 includes, in addition to ring gear 34, a carrier 38, planet pinions 40 journalled on the carrier 38 and sun gear 42. Sun gear 42 is common to a second simple planetary gear unit 44 which includes, in addition to the sun gear, ring gear 46, carrier 48 and planet pinions 50 journalled on the carrier 48 in meshing engagement with the ring gear and the sun gear. Carrier 48 is connected directly to the reaction brake drum 52 about which is positioned a friction brake band 54. Brake band 54 is adapted to be applied and released by a fluid pressure operated reverse-and-low servo 56, thereby providing a torque reaction during operation in manual-low and reverse drive operation.

Overrunning brake 58 is interposed between the drum 52 and the housing for the transmission mechanism. Brake 58 provides a torque reaction point during acceleration from a standing start in the lowest speed ratio.

Shaft 22 is connected also to the torque input side of a direct-and-reverse clutch 60. The output side of the clutch 60 is connected to sun gear 42 through a drive shell 61 which encircles the clutch 32 and the gear unit 36. The output side of the clutch 60 defines also brake drum 62 about which is positioned intermediate speed ratio brake band 64. This band may be applied and released by fluid pressure operated intermediate servo 66. Servo 66 includes the cylinder 68 and a double-acting piston 70 disposed in the cylinder 68 to define a pair of opposing pressure chambers. When both chambers are pressurized or exhausted, the servo is released. When the chamber on the right-hand side of the piston 70 is exhausted and the chamber on the left-hand side of the piston is pressurized, the servo actuates the brake hand causing brake application.

Ring gear 46 and carrier 38 are connected drivably to power output shaft 72. A governor valve assembly comprising a primary governor and a secondary governor is connected drivably to the shaft 72 so that it may develop a speed signal that is proportional in magnitude to the speed of rotation of shaft 72. The governor assembly is indicated by reference character 74. Shaft 72 in turn is connected to the road wheels 76 through a suitable driveshaft and differential-and-axle assembly.

The transmission mechanism of FIG. 1 is capable of establishing three forward-driving speed ratios and a single reverse speed ratio. The lowest forward driving speed ratio is obtained by engaging forward clutch 32, which remains applied during operation in each of the two other forward driving speed ratios. Turbine torque during operation of the lowest speed ratio is distributed through the clutch 32 to the ring gear 34. Since the carrier 38 is connected to the output shaft 72, which resists rotation, reaction torque on the sun gear 42 will be distributed through the second gear unit 44 as the carrier 48 acts as a reaction member. Carrier 48 is held against rotation by the overrunning brake 58. The reaction torque in the gear unit 44 causes forward driving rotation of the ring gear 46 and the output shaft 72. Thus a split torque delivery path is established through the gearing.

If continuous operation in the lowest speed ratio is desired, or if coast braking operation in the lowest ratio is desired, brake band 54 is applied. Brake band 54 complements the braking action of the overruning brake 58 during forward driving in the lowest ratio.

A ratio change in the intermediate speed range is accomplished by releasing brake band 54 and applying intermediate speed ratio band 64. Sun gear 42 then becomes anchored so that it may serve as a reaction element. Forward clutch 32 continues to deliver turbine torque to the ring gear 34. With the sun gear 42 acting as a reaction element, carrier 38 and the output shaft 72 are driven at an increased speed ratio. Gear unit 44 becomes inactive and overrunning brake 58 freewheels.

Forward drive operation in the high speed direct drive ratio is accomplished by releasing both brakes and applying simultaneously both clutches. This causes the elements of the gear system to be locked together for rotation in unison with a 1:1 speed ratio.

Reverse drive operation is obtained by releasing the forward drive clutch 32 and applying direct and reverse clutch 60. At the same time friction brake band 54 is applied. Turbine torque now becomes delivered directly to the sun gear 42 through clutch 60 and through the drive shell 61. With the carrier 48 anchored by the brake band 54, ring gear 46 is driven in a reverse direction.

In FIG. 1 we have shown in block diagram form a control circuit for controlling the actuation and release of the clutches and brakes shown in FIG. 2. The circuit includes the engine driven pump 30 which applies circuit pressure to the main regulator valve 78 which in turn maintains a regulated pressure level in supply passage 80 extending to the manual valve 82. The manual valve may be adjusted to any of the positions indicated in FIG. 1 and identified by reference symbol R, N, D,2 and 1 which, respectively, refer to reverse, neutral, automatic drive, second speed ratio drive and first speed ratio drive.

During forward drive operation in any of the ratio ranges D,2 or 1, pressure is supplied to the manual valve and through passage 84 to the forward clutch 60.

Direct reverse drive operation pressure distribution through the manual valve to the passage 84 is interrupted and pressure is distributed instead to passage 86. The manual valve also distributes pressure to passage 88 during reverse drive operation as well as during low speed ratio operation thereby allowing pressure distribution to reverse-and-low servo 56.

Selective pressure distribution to the direct-and-reverse clutch 32 and the intermediate servo 66 is provided by the 1–2 shift valve assembly 90 and the 2–3 shift valve assembly 92. The shift valves respond to governor pressure distributed to one side thereof through governor pressure passage 94 which communicates with the governor valve assembly 74. The shift valve responds also to the output pressure of a throttle pressure boost valve 96. Valve 96 receives circuit pressure from the main regulator valve and modifies it in accordance with the signal received from the output side of throttle valve 98, the latter communicating with the valve 96 through passage 100. The pressure signal in passage 102 on the output side of valve 96 is generally proportional in magnitude to the engine torque.

The throttle valve signal in passage 100 is distributed also to cut-back valve 104. When the cut-back valve assumes one operating mode, pressure is distributed through it from passage 100 to passage 106 which extends to the main regulator valve 78. When passage 106 is pressurized, the main regulator valve functions to regulate pressure at a higher pressure level than the pressure level that exists with passage 106 exhausted. The cut-back valve 104 responds to governor pressure which is distributed to it from the governor pressure passage 94.

At low operating speeds during acceleration from a standing start, the cut-back valve distributes pressure to passage 106 thereby causing an increase in the line pressure. Upon an increase in vehicle speed the cut-back valve moves to exhaust passage 106. At that time the converter is operating in a higher speed ratio and the delivered torque is of a reduced magnitude.

The throttle valve actuator is shown schematically at 108 in FIGS. 1 and 3. Actuator 108 includes an actuator housing 110 in which is positioned a flexible diaphragm 112. A diaphragm spring 114 urges the diaphragm in a downward direction as indicated in FIG. 3. The spring force is transmitted to the throttle valve 98 through actuating rod 116.

The housing 110 and the diaphragm 112 cooperate to define a vacuum pressure chamber 118. This is in communication with vacuum pressure passage 120 which extends to vacuum regulator valve 122. Another vacuum pressure passage 124 extends from the regulator 122 to a vacuum reservoir tank 126. This in turn is in communication with the engine intake manifold through passage 128. A one-way check valve 130 in passage 128 provides one-way communication between the engine intake manifold and the reservoir tank 126.

When a negative pressure exists in passage 120, a hydrostatic pressure unbalance exists across diaphragm 112, the lower side thereof being subjected to atmospheric pressure. The differential pressure produces a force on the diaphragm 112 that opposes the force of spring 114.

An increase in engine vacuum will result in an increased force that opposes the spring. This results in a lower modulated output pressure for the valve 98. Conversely, a decrease in vacuum will result in an increase in the output pressure for valve 98. The vacuum source for passage 120 is a tank 126. The magnitude of the vacuum made available to the passage 120 is controlled by a regulator 122. This comprises a first housing portion 132 and a second housing portion 134. The housing portions 132 and 134 are joined together at their margins 136, and a flexible diaphragm 138 is secured between the housing margins, as indicated, thereby defining an upper pressure chamber 140 and a lower pressure chamber 142. Chamber 142 is exposed to atmospheric pressure through vent passage 144. Chamber 140 is exposed to the pressure in passage 120, the latter communicating with port 146 extending through the hollow interior 148 of the housing 134.

The diaphragm spring 150 is located in the interior 148. It is seated on a throttle shaft 152 slidably received within an opening formed in the upper end of the housing 134. The extended end of the shaft 152 is connected to the engine throttle valve through a mechanical linkage indicated at 154. This linkage may be of various types, but they must be capable of translating rotary motion of linkage element 156 connected to the engine throttle valve to reciprocating motion of the shaft 152. The wide open position of the engine throttle corresponds to the position of element 156 shown at WOT. The idle position for the engine throttle valve is indicated by the position of element 156 shown at IDLE. As the throttle moves from the wide open position to the idle position, the shaft 152 is moved downwardly, thereby compressing the spring 150 and increasing the net force acting on the diaphragm 138.

The lower side of the diaphragm has secured thereto a valve pin 158. It engages movable valve member 160 which is received slidably within valve opening 162 formed in the lower end of housing portion 132. A closure member 164 is threadably received within the opening 162 and closes the open end of the housing. Closure member 164 is provided with an atmospheric vent orifice 166.

Member 160 is provided with control orifice 168, which registers with the end of valve pin 158. When the valve pin 158 is moved downwardly, orifice 168 becomes effectively sealed. The upper end of valve element 160 engages valve seat 170 threadably received within the lower part of chamber 142 of housing 132. An annular seal 172 is situated between the element 160 and member 170. Element 160 is forced in an upward direction, as viewed in FIG. 3, by valve spring 174, thus tending normally to establish a sealing action between member 170 and member 160. Pin 158 is provided with a central opening 176 which is adapted to establish communication between chamber 162 and chamber 140 when valve element 160 moves away from seal 172. Chamber 162 in turn communicates with passage 124 through port 178.

Reservoir tank 126 normally is charged by means of the connection provided by passage 128 and valve 130.

If it is assumed that the engine throttle is in the idle position, spring 150 is compressed which causes pin 158 to seal orifice 168. A tendency exists at that time for valve element 160 to move away from the seal 172, thereby establishing controlled communication between port 178 and chamber 140, the latter being in communication with passage 120 and with chamber 118 of the throttle valve assembly. The vacuum in chamber 118 under these conditions is a maximum and, therefore, the magnitude of the throttle pressure signal made available to the transmission circuit is a minimum.

If the operator should advance the engine throttle from the idle position toward the wide open throttle position, the compression force on spring 150 is relieved. This changes the mechanical force on balance on the diaphragm 138 and this unbalance results in a change in the pressure on balance so that the net forces remain the same. A greater degree of communication then exists between passage 176 and the atmospheric port 166, and a decreased degree of communication then exists between the port 178 and the passage 176. This then results in an effective pressure increase in line 120, or in a reduction in vacuum. The result of this is an increased throttle pressure for the transmission control circuit. This change from a lower value to a higher value for the transmission throttle valve pressure occurs regardless of changes in the engine intake manifold pressure. The change is due only to the change in the throttle position.

The mechanical motion transmitting characteristic of the linkage 154 can be calibrated to suit any particular engine installation. It may be calibrated to produce a linear variation of throttle pressure with throttle position, or any controlled modification of the linear relationship can be achieved as desired.

If it is deemed to be desirable to provide a change in the functional relationship between throttle position and transmission throttle pressure upon actuation of an exhaust gas recirculation control for engine emissions, this can be achieved by providing a solenoid actuator such as that shown at 200 in FIG. 3. The solenoid may be made a part of an electrical circuit that includes a switch 202, which may be closed by the EGR control 204 illustrated schematically in FIG. 1. The EGR control may respond to engine temperature, engine speed, manifold vacuum or any combination of these variables. When the solenoid actuator 200 is energized, an additional force is exerted on the shaft 152 in a downward direction through the compression of spring 150. This provides a reduced transmission throttle valve signal which would correspond to the reduction of engine torque resulting from the actuation of the exhaust gas recirculation controls.

Having thus described a preferred embodiment of our invention, what we claim and desire to secure by U.S. Letters Patent is:

1. A control system for a power transmission mechanism for use in an automotive vehicle driveline having an internal combustion engine with a throttle-controlled, air-fuel mixture intake manifold, multiple ratio gearing connecting drivably the engine to a power output member of the transmission, clutch-and-brake means for controlling the relative motion of the elements of said gearing, fluid pressure operated servos for controlling the actuation and release of said clutch-and-brake means to establish selectively the torque delivery paths, a pressure source including a fluid pressure regulator means for supplying control pressure to said servos, control valve means forming a hydraulic connection between said pressure source and said servos including shift valves for distributing pressure selectively to said servos, a throttle pressure modulator valve means communicating with said regulated pressure source and with said shift valves whereby the latter receives a pressure signal that is an indicator of engine torque, said throttle pressure modulator valve means including a vacuum pressure sensitive actuator, a source of vacuum, vacuum pressure regulator valve means establishing controlled communication between said vacuum source and said actuator whereby said throttle pressure signal is proportional to the vacuum signal made available to said actuator, and a connection between the engine throttle and said vacuum pressure regulator valve means whereby the regulated vacuum pressure is functionally related to engine throttle movement.

2. A control system for a power transmission mechanism for use in an automotive vehicle driveline having an internal combustion engine with a throttle controlled, air-fuel mixture intake manifold, multiple ratio gearing connecting drivably the engine to a power output member of the transmission, clutch and brake means for controlling the relative motion of the elements of said gearing, fluid pressure operated servos for controlling the actuation and release of said clutch and brake means to establish selectively the torque delivery paths, a pressure source including a fluid control pressure regulator means for supplying control pressure to said servos, control valve means forming a hydraulic connection between said pressure source and said servos including shift valves for distributing pressure selectively to said servos, a throttle pressure modulator valve means communicating with said regulated pressure source and with said shift valves whereby the latter receives a pressure signal that is an indicator of engine torque, said throttle valve pressure modulator valve means including a vacuum pressure sensitive actuator, a source of vacuum, vacuum pressure regulator valve means establishing controlled communication between said vacuum source and said actuator whereby said throttle pressure signal is proportional to the vacuum signal made available to said actuator, and a connection between the engine throttle and said vacuum pressure regulator valve means whereby the regulated vacuum pressure is functionally related to engine throttle movement, said throttle pressure modulator valve means being connected also to said control pressure regulator valve whereby the operated pressure level made available to said servos is determined by engine throttle movement, said vacuum pressure source including a reservoir and a valve controlled passage connecting said reservoir and the engine intake manifold whereby said reservoir is charged with engine manifold pressure.

3. The combination as set forth in claim 1 whereby said vacuum pressure regulator valve means comprises a movable valve element, a pressure movable member connected to said movable valve element, a companion valve element registering with said movable valve element and cooperating therewith to define a controlled pressure delivery path between said vacuum source and said actuator, spring means acting upon said movable member for establishing a force that tends to increase the degree of communication between said vacuum source and said actuator and a mechanical connection between said engine throttle and said spring means whereby the force of said spring is decreased as the engine throttle position is advanced to a wide open setting.

4. The combination as set forth in claim 2 whereby said vacuum pressure regulator valve means comprises a movable valve element, a pressure movable member connected to said movable valve element, a companion valve element registering with said movable valve element and cooperating therewith to define a controlled pressure delivery path between said vacuum source and said actuator, spring means acting upon said movable member for establishing a force that tends to increase the degree of communication between said vacuum source and said actuator and a mechanical connection between said engine throttle and said spring means whereby the force of said spring is decreased as the engine throttle position is advanced to a wide open setting.

5. The combination as set forth in claim 3 whereby the mechanical connection between said spring and said engine throttle includes a movable member engaging said spring to provide a spring force reaction point, a cam linkage means for translating rotary motion of said throttle to reciprocating motion of said movable throttle member, the magnitude of the throttle pressure signal made available by said throttle valve means being determined in part by the geometry of the cam linkage means.

6. The combination as set forth in claim 4 whereby the mechanical connection between said spring and said engine throttle includes a movable member engaging said spring to provide a spring force reaction point, a cam linkage means for translating rotary motion of said throttle to reciprocating motion of said movable throttle member, the magnitude of the throttle pressure signal made available by said throttle valve means being determined in part by the geometry of the cam linkage means.

* * * * *